(12) United States Patent
Schwob

(10) Patent No.: US 8,700,612 B2
(45) Date of Patent: Apr. 15, 2014

(54) KNOWLEDGE MATRIX UTILIZING SYSTEMATIC CONTEXTUAL LINKS

(75) Inventor: Pierre Schwob, Palo Alto, CA (US)

(73) Assignee: ContextU, Inc., Palo Alto, CA (US)

( * ) Notice: Subject to any disclaimer, the term of this patent is extended or adjusted under 35 U.S.C. 154(b) by 0 days.

(21) Appl. No.: 13/592,197

(22) Filed: Aug. 22, 2012

(65) Prior Publication Data

US 2013/0054577 A1    Feb. 28, 2013

Related U.S. Application Data

(60) Provisional application No. 61/526,668, filed on Aug. 23, 2011, provisional application No. 61/527,567, filed on Aug. 25, 2011, provisional application No. 61/541,004, filed on Sep. 29, 2011.

(51) Int. Cl.
*G06F 17/30*        (2006.01)

(52) U.S. Cl.
USPC ........... 707/722; 707/724; 707/725; 707/726; 707/738; 707/754

(58) Field of Classification Search
None
See application file for complete search history.

(56) References Cited

U.S. PATENT DOCUMENTS

| | | | | |
|---|---|---|---|---|
| 5,897,670 A * | 4/1999 | Nielsen | ........................ | 715/866 |
| 5,953,718 A * | 9/1999 | Wical | .................................. | 1/1 |
| 6,166,736 A * | 12/2000 | Hugh | ........................... | 715/798 |
| 6,847,966 B1 * | 1/2005 | Sommer et al. | ................ | 707/739 |
| 6,996,774 B2 * | 2/2006 | Liongosari et al. | ........... | 715/236 |
| 7,076,484 B2 * | 7/2006 | Dworkis et al. | ...................... | 1/1 |
| 7,280,481 B2 * | 10/2007 | Rong | ............................ | 370/238 |
| 7,386,439 B1 * | 6/2008 | Charnock et al. | ................. | 704/9 |
| 7,483,892 B1 * | 1/2009 | Sommer et al. | ....................... | 1/1 |
| 7,519,589 B2 * | 4/2009 | Charnock et al. | ................. | 1/1 |
| 2004/0090472 A1 * | 5/2004 | Risch et al. | ................... | 345/853 |
| 2004/0153456 A1 * | 8/2004 | Charnock et al. | ............... | 707/10 |
| 2005/0086188 A1 * | 4/2005 | Hillis et al. | ...................... | 706/50 |
| 2005/0171940 A1 * | 8/2005 | Fogg et al. | ......................... | 707/3 |
| 2006/0064415 A1 * | 3/2006 | Guyon et al. | ..................... | 707/6 |
| 2006/0085370 A1 * | 4/2006 | Groat et al. | ....................... | 707/1 |
| 2006/0156237 A1 * | 7/2006 | Williams et al. | ............. | 715/720 |
| 2006/0206512 A1 * | 9/2006 | Hanrahan et al. | ............. | 707/102 |

(Continued)

OTHER PUBLICATIONS

Frawley, et al., Knowledge Discovery in Databases: An Overview, AI Magazine vol. 13 No. 3, 1992.*

(Continued)

*Primary Examiner* — Neveen Abel Jalil
*Assistant Examiner* — Kristofer Biskeborn
(74) *Attorney, Agent, or Firm* — Blakely, Sokoloff, Taylor & Zafman LLP

(57) ABSTRACT

Exemplary methods, apparatuses, and systems receive a search input, select a first cell related to the search input, and display data of the first cell and selectable objects in response to the search input. Each cell defines a way to display a portion of searchable data within a first contextual relationship and a way to display a portion of the searchable data within a second, different contextual relationship. Selection of a first selectable object results in displaying a first portion of the data of the first cell with a first set of other data related to the first portion based upon the first contextual relationship. Selection of a second selectable object results in the computer displaying a second portion of the data of the first cell with a second set of other data related to the second portion based upon the second contextual relationship.

29 Claims, 12 Drawing Sheets

(56) References Cited

U.S. PATENT DOCUMENTS

| | | | | |
|---|---|---|---|---|
| 2006/0238538 | A1* | 10/2006 | Kapler et al. | 345/440 |
| 2006/0259509 | A1* | 11/2006 | Stolte et al. | 707/102 |
| 2006/0271526 | A1* | 11/2006 | Charnock et al. | 707/3 |
| 2006/0277167 | A1* | 12/2006 | Gross et al. | 707/3 |
| 2007/0136296 | A1* | 6/2007 | Molesky | 707/10 |
| 2007/0203816 | A1* | 8/2007 | Costache et al. | 705/35 |
| 2007/0226195 | A1* | 9/2007 | Huck | 707/3 |
| 2007/0239702 | A1* | 10/2007 | Vassilvitskii et al. | 707/5 |
| 2008/0022216 | A1* | 1/2008 | Duval | 715/762 |
| 2008/0091656 | A1* | 4/2008 | Charnock et al. | 707/3 |
| 2008/0115082 | A1* | 5/2008 | Simmons et al. | 715/804 |
| 2008/0126858 | A1* | 5/2008 | Barras | 714/25 |
| 2008/0270946 | A1* | 10/2008 | Risch et al. | 715/848 |
| 2008/0276201 | A1* | 11/2008 | Risch et al. | 715/853 |
| 2008/0288306 | A1* | 11/2008 | MacIntyre et al. | 705/7 |
| 2009/0037848 | A1* | 2/2009 | Tewari et al. | 715/835 |
| 2009/0138826 | A1* | 5/2009 | Barros | 715/841 |
| 2009/0157663 | A1* | 6/2009 | Kate | 707/5 |
| 2009/0287685 | A1* | 11/2009 | Charnock et al. | 707/5 |

OTHER PUBLICATIONS

Matheus, et al., Systems for Knowledge Discovery in Databases, IEEE Transactions on Knowledge and Data Engineering, vol. 5, No. 6., Dec. 1993.*

Roddick, et al., A Survey of Temporal Knowledge Discovery Paradigms and Methods, IEEE Transactions on Knowledge and Data Engineering, vol. 14, No. 4, Jul./Aug. 2002.*

Cooper, Gregory, A Simple Constraint-Based Algorithm for Efficiently Mining Observational Databases for Causal Relationships, Data Mining and Knowledge Discovery 1, 203-224, 1997.*

Knowledge—Inside Search—Google, The Knowledge Graph, www.google.com/insidesearch/features/search/knowledge.html, downloaded from the internet Aug. 23, 2012, 3 pages.

Introducing the Knowledge Graph: things, not strings—Official Google Blog, googleblog.blogspot.com/2012/05/introducing-knowledge-graph-things-not.html, May 16, 2012, 4 pages.

PCT International Search Report and Written Opinion for PCT/US2012/052164, mailed Nov. 27, 2012, 12 pages.

Andreas Neumann: "Spatial, Temporal and Thematic Navigation", Visualizing Biographies of European Artists Using a Task Oriented User Interface Design Approach, PhD Dissertation, Jan. 1, 2010, pp. 1-147, XP055044506.

Schwabe D et al: "Systematic Hypermedia Application Design with OOHDM", Hypertext '96. 7th ACM Conference on Hypertext, Washington, Mar. 16-20, 1996, New York, ACM, US, vol. Conf. 7, pp. 116-128, XP000724324.

Brian Tomaszewski: "Producing Geo-historical Context from Implicit Sources: A Geovisual Analytics Approach", The Cartographic Journal, vol. 45, No. 3, Aug. 1, 2008, pp. 165-181, XP055044571.

* cited by examiner

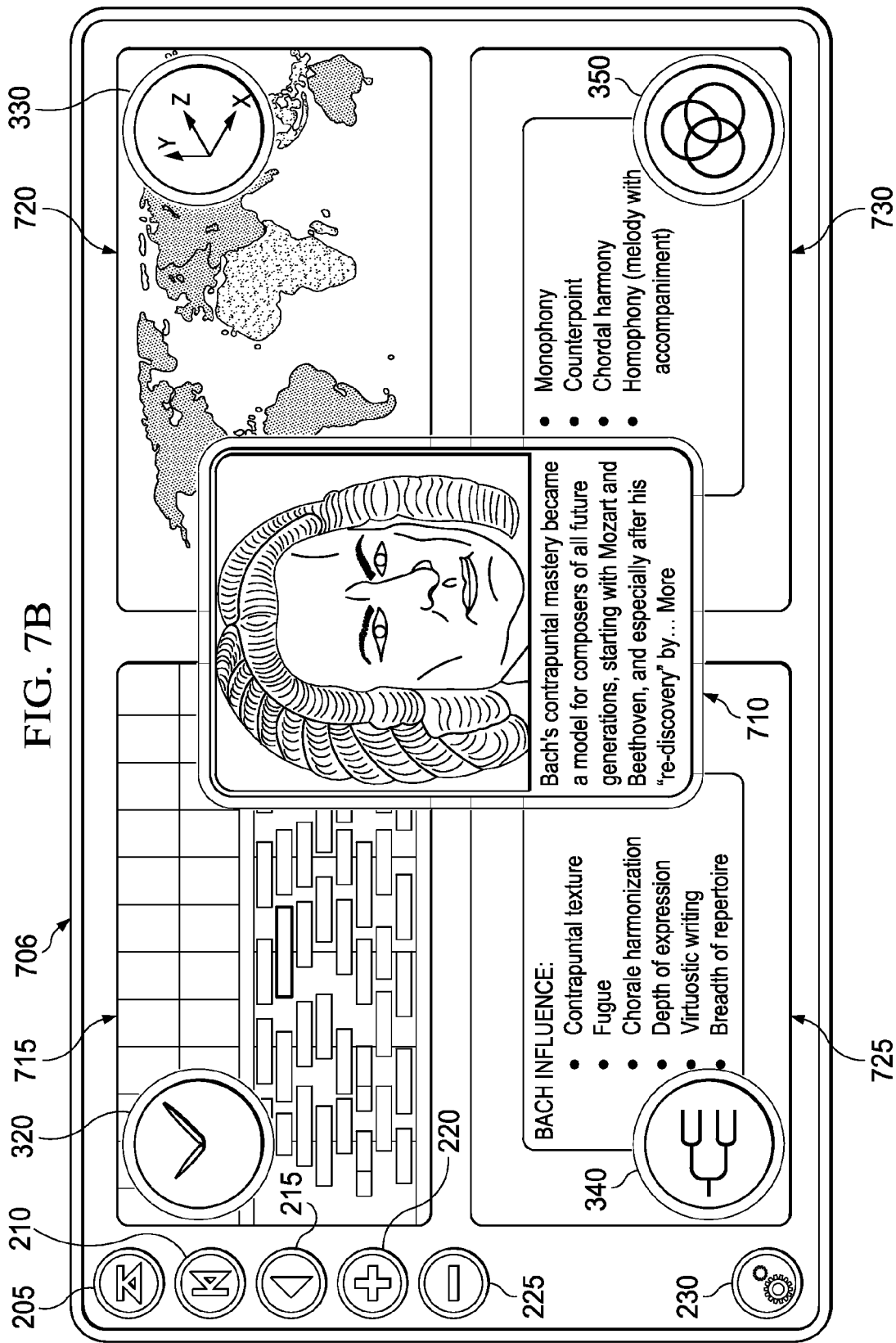

KNOWLEDGE MATRIX UTILIZING SYSTEMATIC CONTEXTUAL LINKS

CROSS-REFERENCE TO RELATED APPLICATIONS

This application claims the benefit of U.S. Provisional Application No. 61/526,668, filed Aug. 23, 2011, U.S. Provisional Application No. 61/527,567, filed Aug. 25, 2011, and U.S. Provisional Application No. 61/541,004, filed Sep. 29, 2011, each of which is hereby incorporated by reference.

FIELD

The various embodiments described herein relate to apparatuses, systems, and methods to display data within various contextual relationships. In particular, the embodiments relate to searching and displaying knowledge based upon systematic contextual views.

COPYRIGHT NOTICE/PERMISSION

A portion of the disclosure of this patent document contains material this is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright 2012, ContextU, Inc., All Rights Reserved.

BACKGROUND

Students typically study various subjects. For example, students may study the discovery of the Americas by Christopher Columbus in a first year history course, Roman Antiquity in a second year course, and the Industrial Revolution in a third year course. The students may study these subjects without a sense of the greater context of the facts that are the focus of each subject. It is often more useful to know the relationship between facts than to know the facts themselves. For example, it is often more informative to know that Mozart was born before Beethoven than to know the date Mozart was born.

SUMMARY OF THE DESCRIPTION

Exemplary methods, apparatuses, and systems receive a search input and select a first cell, within a matrix of cells, that includes data related to the search input. Each cell within the matrix includes searchable data and defines a way to display a portion of the searchable data within a first contextual relationship and a way to display a portion of the searchable data within a second, different contextual relationship. In response to the search input, the data of the first cell and a plurality of selectable objects are displayed. Selection of a first of the plurality of selectable objects results in the displaying of a first portion of the data of the first cell with a first set of other data related to the first portion based upon the first contextual relationship. Selection of a second of the plurality of selectable objects results in the displaying of a second portion of the data of the first cell with a second set of other data related to the second portion based upon the second contextual relationship.

In one embodiment, the first and second contextual relationships are selected from a group comprising of a temporal relationship, a spatial relationship, a causal relationship, and an inclusion relationship. Temporal relationships refer to relationships between data in time. Spatial relationships refer to geographical relationships between data, which may be shown through maps in two or three dimensions. Causal relationships refer to cause and effect relationships between data. Inclusion relationships refer to groups in which data is included.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIG. 7B illustrates another exemplary GUI window displaying data of a cell with a plurality of selectable objects to view the subject of the data in varying contextual relationships;

DETAILED DESCRIPTION

Embodiments described herein utilize a matrix of cells to systematically provide a user with the presentation of knowledge in a plurality of contexts. The embodiments present data including persons, events, locations, objects, and concepts and their contextual relationships to other persons, events, locations, objects, and concepts. Exemplary contextual relationships include temporal relationships, spatial relationships, causal relationships, and inclusion relationships. The use of contextual information may improve user interest, learning, understanding, and retention of facts, concepts, and relationships therebetween.

In one embodiment, the content of the matrix of cells is categorized into various branches of knowledge and each branch of knowledge is represented by an array of cells. For a matrix composed of n-arrays, each array is associated with one particular field or sub-field of knowledge. The matrix is useful in presenting relationships between arrays, as discussed in further detail herein. By way of example, the History of the Universe can be related to, for example, Mathematics, Physics, Chemistry, Biology, Human History, and Philosophy. Such relationships between fields of knowledge provide a user with an interactive and adaptive perspective on a particular piece of knowledge.

Figure 1:
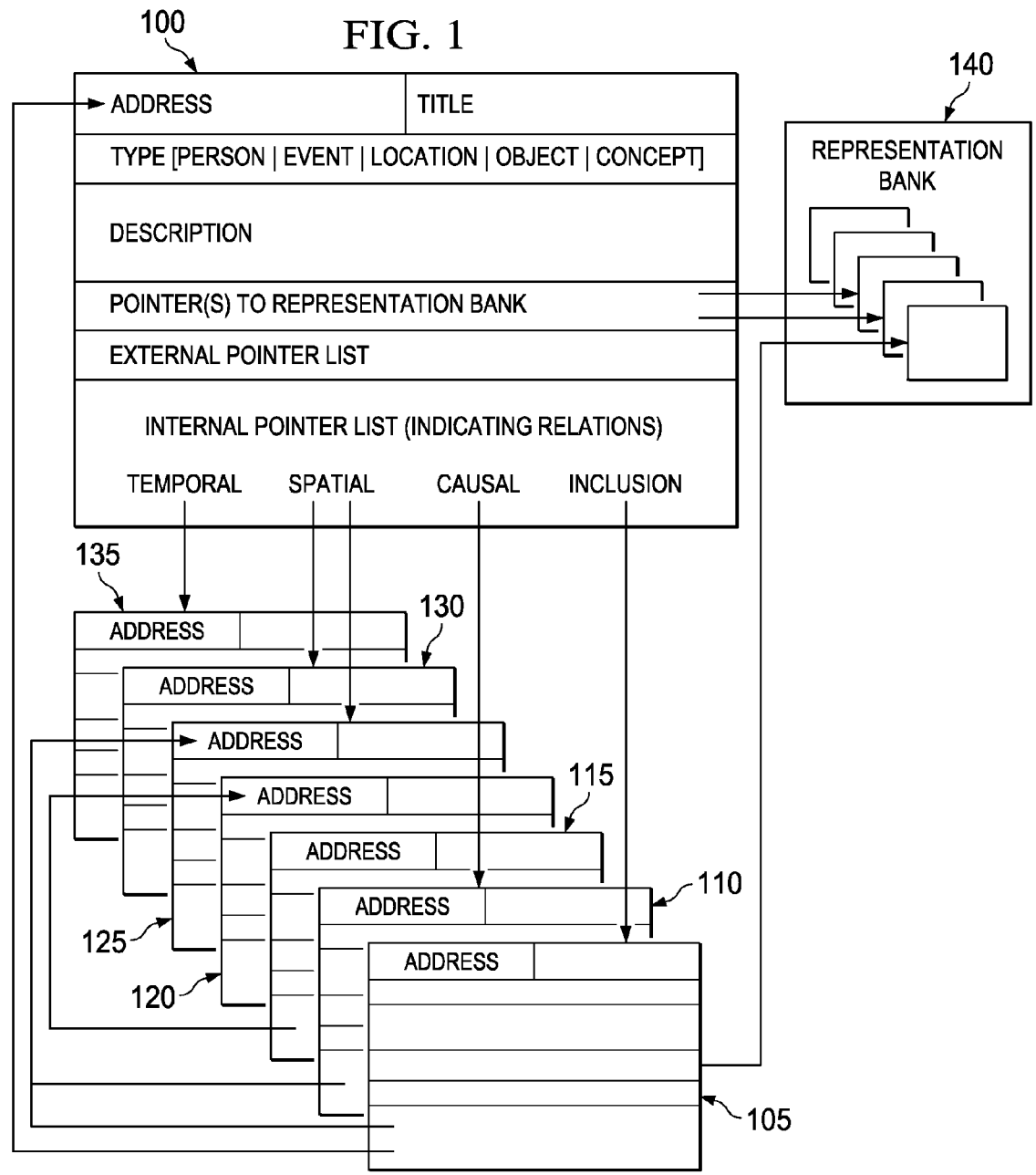
FIG. 1 illustrates an exemplary cell within a matrix of cells.

FIG. 1 illustrates an exemplary cell 100 within a matrix of cells. The matrix is an n-dimensional matrix composed of cells of data pertaining, each, to a particular branch of knowledge. The data is contained in cells stored as one or more records, e.g., in one or more databases or relational databases.

The exemplary cell 100 includes a plurality of fields and is related to/linked to a plurality of other cells 105-135, as represented by arrow pointers. The exemplary cell 100 includes an address field for a unique address identifier. In one embodiment, other cells use the address identifier to link (e.g., via pointer or other addressing mechanism) to the exemplary cell 100.

The cell 100 further includes a title field and a type field. The title field includes intrinsic attributes, such as a name of a person, event, location, object, or concept, or a short description of the data contained in the cell 100. The type field is for a data point type. Exemplary data point types include a person, event, location, object, or concept.

The description field includes descriptive text and serves as the substantive description of the data point. For example, if cell 100 is a data point for a person, the description field may include biographical information for that person.

The cell 100 further includes a field for pointers to items within a representation bank 140. The representation bank 140 contains graphics, images, audio, and video that can be utilized to illustrate the content of the cell 100. Exemplary data contained in the representation bank 140 includes maps, timelines, portraits, etc. Cells link to data in the representation bank 140 using representation pointers or other addressing mechanisms. For example, when a map is contained in the representation bank 140, pointers to the representation bank 140 may be associated with one or more sets of coordinates of the map to emphasize certain features of the map on a display. Additionally, pointers to the representation bank 140 may be used to designate a center coordinate and a zoom factor. Such a zoom factor instruction may be relevant when displaying a timeline, a map, as well as other views. Other applications of a zoom factor will be described in greater detail below.

Cells may utilize different numbers of pointers to the representation bank 140, or no pointers at all, depending upon the content of each cell. As illustrated, the exemplary cell 100 has two pointers to the representation bank 140, while another cell 105 has a single pointer to the representation bank 140.

The exemplary cell 100 further includes a field for external pointers. External pointers may reference scholarly articles, websites, and other resources that are external to the matrix of cells. For example, the external pointers may include a hyperlink, uniform resource locator (URL), Internet protocol (IP) address, or other external link.

The exemplary cell 100 further includes a field for internal pointers to other cells or arrays within the matrix. The exemplary cell 100 is related to a plurality of other cells 105-135, as represented by arrow pointers. Internal pointers define ways for a user to navigate between cells within the matrix. Navigation through the matrix is, in effect, navigation through the relationships between the facts, events, concepts and locations that are present in the matrix. The internal pointers provide a link to access a cell for additional data. For example, if the exemplary cell 100 is a data point for a person, and the description field includes biographical information for that person including a location for the person's birthplace, an internal pointer may be used to access a cell with more detail regarding that birthplace generally.

Furthermore, contextual relationships are assigned to internal pointers. At least some of the internal pointers are categorized according to one or more of temporal relationships, spatial relationships, causal relationships, and inclusion relationships. Examples of these four contextual relationship categories of internal pointers will be discussed herein with reference to FIGS. 2-8. An internal pointer may be categorized under multiple relationships. For example, a single cell may have both a causal relationship and an inclusion relationship with another cell.

In one embodiment, each cell includes internal pointers categorized under at least two of these four relationships. For example, each cell would at least include internal pointers categorized under temporal and spatial relationships (or any of the other five possible combinations of two of the four relationships applied to all cells). Cells may also have internal pointers categorized under additional categories, as long as all cells at least include internal pointers categorized under the same two contextual relationship categories as all other cells. In another embodiment, each cell includes at least three of these four relationships. For example, each cell would at least include internal pointers categorized under temporal, spatial, and inclusion relationships. In yet another embodiment, each cell includes internal pointers categorized under all four relationships. The inclusion of internal pointers categorized under two, three, or all four contextual relationships in each cell in the matrix provides a consistent and systematic presentation of contextual knowledge.

As illustrated, exemplary cell 100 has one temporal pointer to another cell 135, two spatial pointers to other cells 125 and 130, one causal pointer to another cell 110, and one inclusion pointer to another cell 105. Additionally, this other cell 105 has internal pointers to the exemplary cell 100 and to another cell 125.

In one embodiment, when more than one internal pointer is provided for a class of internal pointers, a user is presented with a choice of respective links to the data associated with the internal pointers. Continuing with the aforementioned person and biographical information example, the exemplary cell 100 may include a first spatial pointer for the person's place of birth and a second spatial pointer for another significant location associated with the person.

In one embodiment the internal pointer section further includes parameters indicating how data linked to the cell by the internal pointers should be displayed. Exemplary parameters include codes that indicate what type of graph, order, color(s), size, highlights, fonts, etc. should be used. Additionally, the parameters may vary based upon the contextual relationship category or categories associated with the pointer(s).

Figure 2:
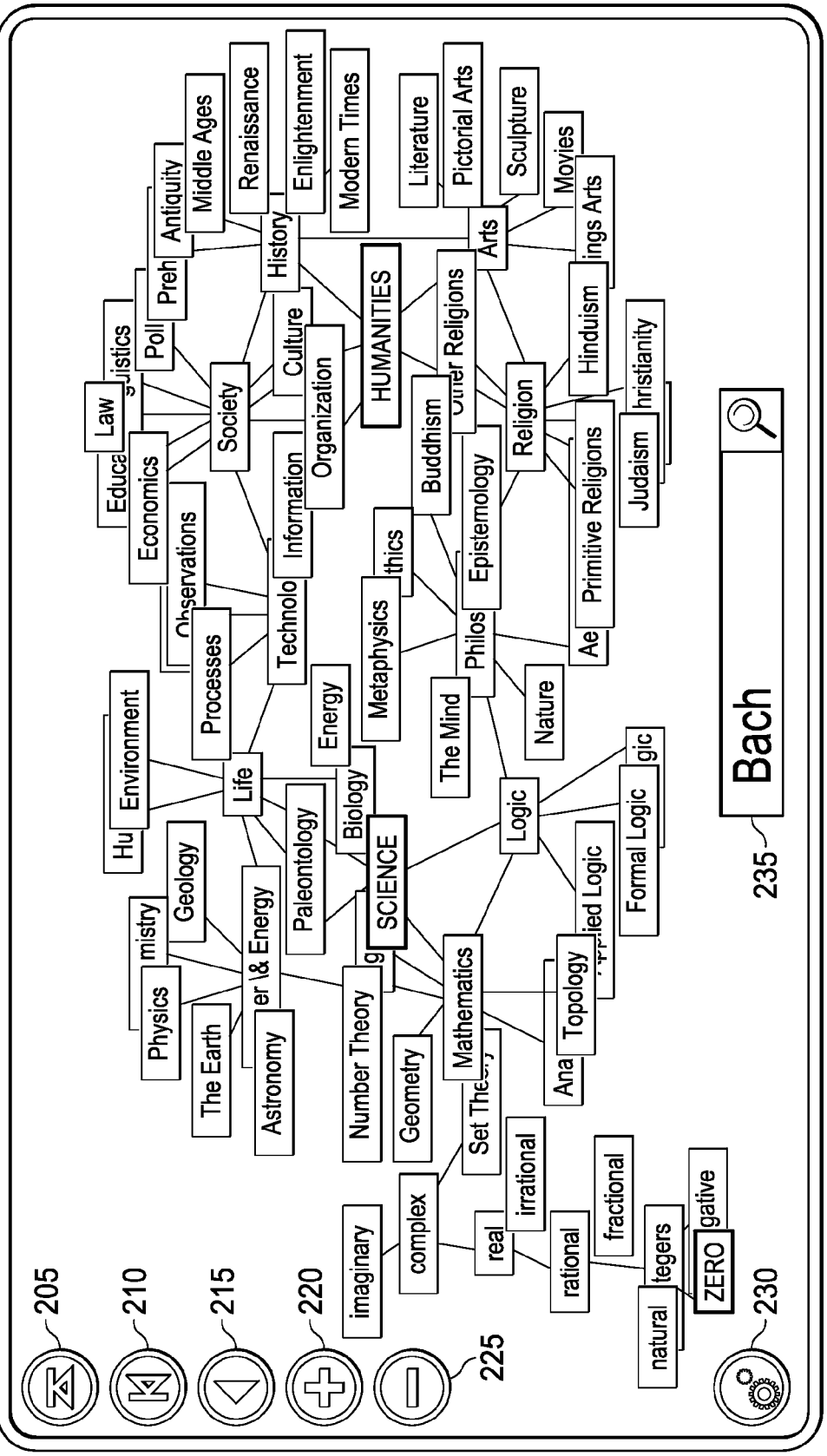
FIG. 2 illustrates an exemplary GUI window displaying a root display of the matrix of cells.

FIG. 2 illustrates an exemplary graphical user interface (GUI) window 200 including a root display of the matrix of cells on a computer or other processing device. The root display includes fields and sub-fields of knowledge and their relationships displayed in an accessible graph as a point-of-entry to the matrix of cells. For example, the field Mathematics is related to sub-fields Number Theory and Geometry. The interconnected fields of knowledge may fill multiple levels of a hierarchy (e.g., field, sub-field, etc.).

The selectable objects along the left side of the display are referred to herein as buttons 205-230. In one embodiment, the buttons 205-230 are provided on all screens and the functionality of some of the buttons becomes relevant as the user navigates through the matrix. Selection of a root button 205 returns the user to the root display screen, e.g., as shown in the GUI window 200. Selection of a start point button 210 results in the display returning to the start of a current search thread. This start point can be the original point of entry to the matrix after initiating a search (e.g., the cell displayed in response to a search), such as the selection of a field or subfield in the GUI window 200, through a query entered in the text search box 235, or via a token (as described further below). Selection of a back button 215 results in displaying the previous cell along a user navigation path. Selection of a zoom in button 220 results in zooming in to a portion of the matrix or the displayed representation. Selection of a zoom out button 225 results in zooming out of the matrix or the displayed representation. In one embodiment, zooming in and out of the matrix shown in GUI window 200 results in the inclusion and exclusion, respectively, of sub-fields and cells at more detailed levels in the matrix. Selection of the settings button 230 provides the user access to system settings. As discussed above, the text search box 235 permits input of one or more search terms or one or more tokens.

In one embodiment, the screen is touch sensitive, and button functionalities described above is enabled by finger gestures on the screen. For example, translation of the display screen in one or more dimensions is results from a one-finger drag. Zooming in/out results from a two-finger pinch/expansion. Rotation results from a two-finger twist/drag about an axis. Additionally, a two-finger gesture, with one finger fixed and another finger dragging, results in a change of axis.

In one embodiment, the root display shown in the GUI display 200 includes fields of knowledge linked through interactive "tension" lines. Dragging a box containing a field of knowledge across the GUI display 200 results in the "stretching" of a corresponding tension line and, in turn, the movement of fields of connected fields of knowledge. This interactive feature enables a user to manipulate the density of fields and subfields of knowledge displayed in a given area of the matrix, e.g., to provide a clear view of a particular portion of the matrix.

Figure 3:
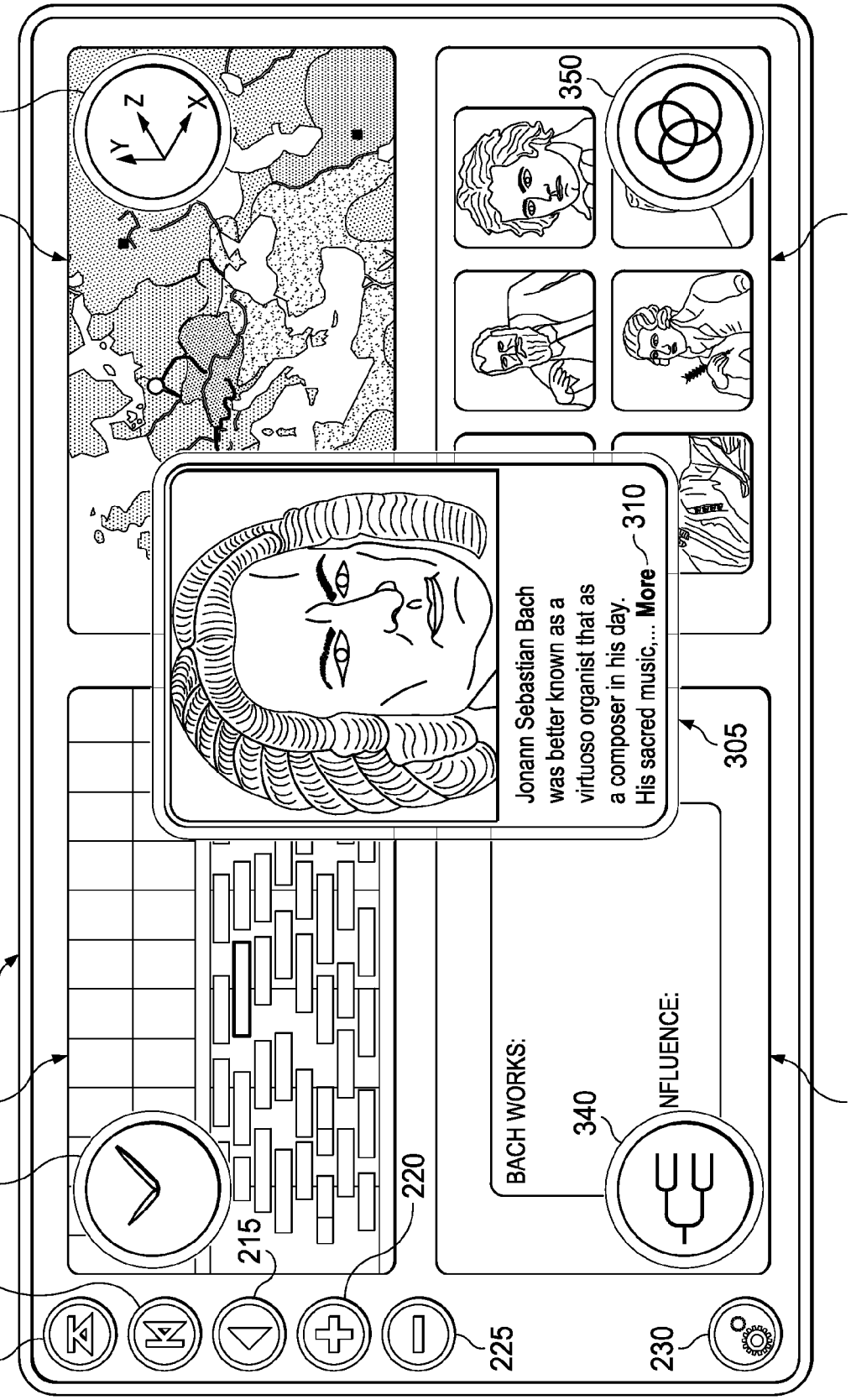
FIG. 3 illustrates an exemplary GUI window displaying data of a cell with a plurality of selectable objects to view the subject of the data in varying contextual relationships.

FIG. 3 illustrates an exemplary GUI display 300 including data and a plurality of selectable objects to view a portion of the data in varying contextual relationships. For example, in FIG. 2, a user has entered "Bach" in the text search box 235. In response to the search, the processing device selects the cell within the matrix for Johann Sebastian Bach and displays the corresponding data. The GUI display 300 represents the original point of entry to the matrix after initiating a search and, as a user navigates through the matrix, selection of the start point button 210 results in the display returning to the GUI display 300. The user may navigate through the matrix by selecting a selectable object or selectable data included within the GUI display 300.

The following will describe embodiments of the invention using Bach as an example. Embodiments of the invention are not limited to a particular data point or type of data point.

In one embodiment, the subject main display screen includes the buttons 205-230 described above and presents an introduction of the subject in five views. A central element 305 offers an image of the subject, Bach, from the representation bank 140 and descriptive text, e.g., from the description field of the cell. In one embodiment, the descriptive text is truncated and includes a selectable link 310 that, when selected, causes the processing device to display the remainder of the descriptive text (e.g., by expanding the central element or by opening a separate view). Alternatively, a user may use a scroll functionality to view the remainder of the descriptive text within the central element 305.

Around the central element 305, the GUI display 300 includes four contextual relationship screens and corresponding selectable objects 315-350. The upper-left portion of the GUI display 300 shows a view of a temporal display screen 315 overlaid by a corresponding selectable temporal display button 320. The upper-right portion of the GUI display 300 includes a view of a spatial display screen 325 overlaid by a corresponding selectable spatial display button 330. The lower-left portion of the GUI display 300 includes a view of a causal display screen 335 overlaid by a corresponding selectable causal display button 340. The lower-right portion of the GUI display 300 includes a view of an inclusion display screen 345 overlaid by a corresponding selectable inclusion display button 345. Receipt of user input selecting one of the four selectable display buttons 320, 330, 340, and 350 results in the computer displaying the corresponding contextual view (e.g., as described with reference to FIGS. 4-8). Additionally, in one embodiment, the four contextual display screens 315, 325, 335, and 345 are selectable, the selection causing the computer to display the corresponding contextual view.

In an alternate embodiment, the GUI display 300 includes only the content of the central display element 305 and the selectable display buttons 320, 330, 340, and 350 in order to utilize more of the display for the descriptive text and representations. In yet another embodiment, the GUI display 300 alternates between the two aforementioned alternate layouts in response to user selection of the zoom in and zoom out buttons 220 and 225, in response to an orientation change of the display (e.g., as detected by processing device using an accelerometer), in response to a preference elected using the settings button 230, or in response to a determined display size.

In yet another alternate embodiment, the GUI display 300 includes four buttons in the right margin, opposite the buttons in the left margin 205-230, to provide for selection of contextual relationships. The four buttons may include labels, e.g., "T" for temporal relationships, "S" for spatial relationships, "C" for causal relationships, and "I" for inclusion relationships, or icons, e.g., a clock face for temporal, a set of axes for spatial, a tree graph for causal, and a Venn diagram for inclusion.

Figure 4:
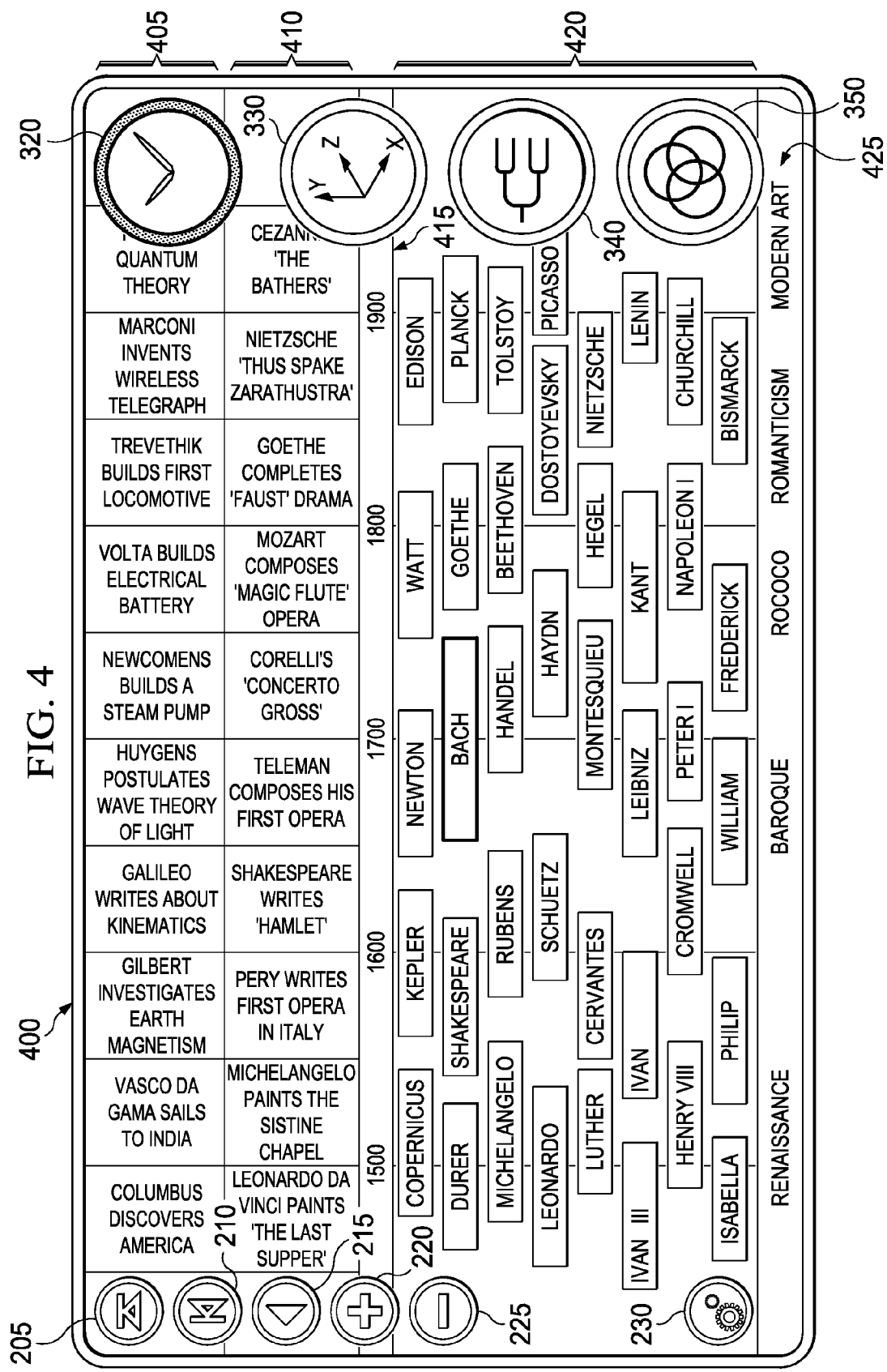
FIG. 4 illustrates the exemplary GUI window displaying the subject of the data in a temporal context.

FIG. 4 illustrates the exemplary GUI window 400 displaying the subject of the data, Bach, in a temporal context. Similar to the description above, in the right margin, four buttons 320, 330, 340, and 350 allow the user to select contextual relationship displays for the subject/portion of the data. In one embodiment, when the temporal context is selected, the temporal context button 320 is highlighted.

The temporal context display in the GUI window 400 shows a date timeline 415 centered upon the time when Bach lived. The GUI window 400 is populated by other data points, e.g., names, events, civilizations, empires, etc., to provide the temporal context around Bach. For example, the GUI window 400 shows that Bach's life overlapped with the lives of Newton and Handel. A user may select another data point to move from the current subject, Bach, to another subject, e.g., Newton.

In one embodiment, the other data points that provide temporal context are organized into multiple timelines. For example, a timeline of events in science 405 and a timeline of events in the humanities 410 are shown at the top of the GUI window 400. The present data point, Bach, is included within a personalities timeline 420. In one embodiment, the data points are colored or labeled to indicate a relevant field to which they belong. A timeline of major periods 425 is shown at the bottom of the GUI window 400.

In one embodiment, the zoom buttons 220 and 225 (or equivalent zoom commands) decrease and increase, respectively, the length in time displayed in the GUI window. Additionally, or alternatively, zooming in and zooming out decreases and increases, respectively, the number of timelines displayed. Additionally, or alternatively, zooming in and zooming out adds and removes, respectively, data points within an affected portion of the timeline. For example, zooming in upon the 18$^{th}$ century may provide the opportunity to include additional personalities, events, etc. that are not displayed when zoomed out to a timeline that spans the 16$^{th}$-20$^{th}$ centuries. In one embodiment, the inclusion or exclusion of data points is determined based upon available display space and relative importance, popularity, relevance, etc. (as described in greater detail below).

The exemplary timelines are illustrated as having a linear scale. When appropriate, timelines may be illustrated along a logarithmic scale. For example, a logarithmic scale would be beneficial for the history of the universe, starting 13.7 billion years ago at the "Big Bang", and ending in the far future, with an asymptotically cold universe. Employing a logarithmic scale facilitates the visualization of events at the very beginning on the universe that occurred within a tiny fraction of second ($10^{-43}$ to $10^2$ seconds after time began) together with events that occurred billions of years later, such as the formation of the solar system (~4.6 billion years ago), the emergence of life (~3.8 billion years ago), and the rise of homo sapiens (~200,000 years ago).

Figure 5:
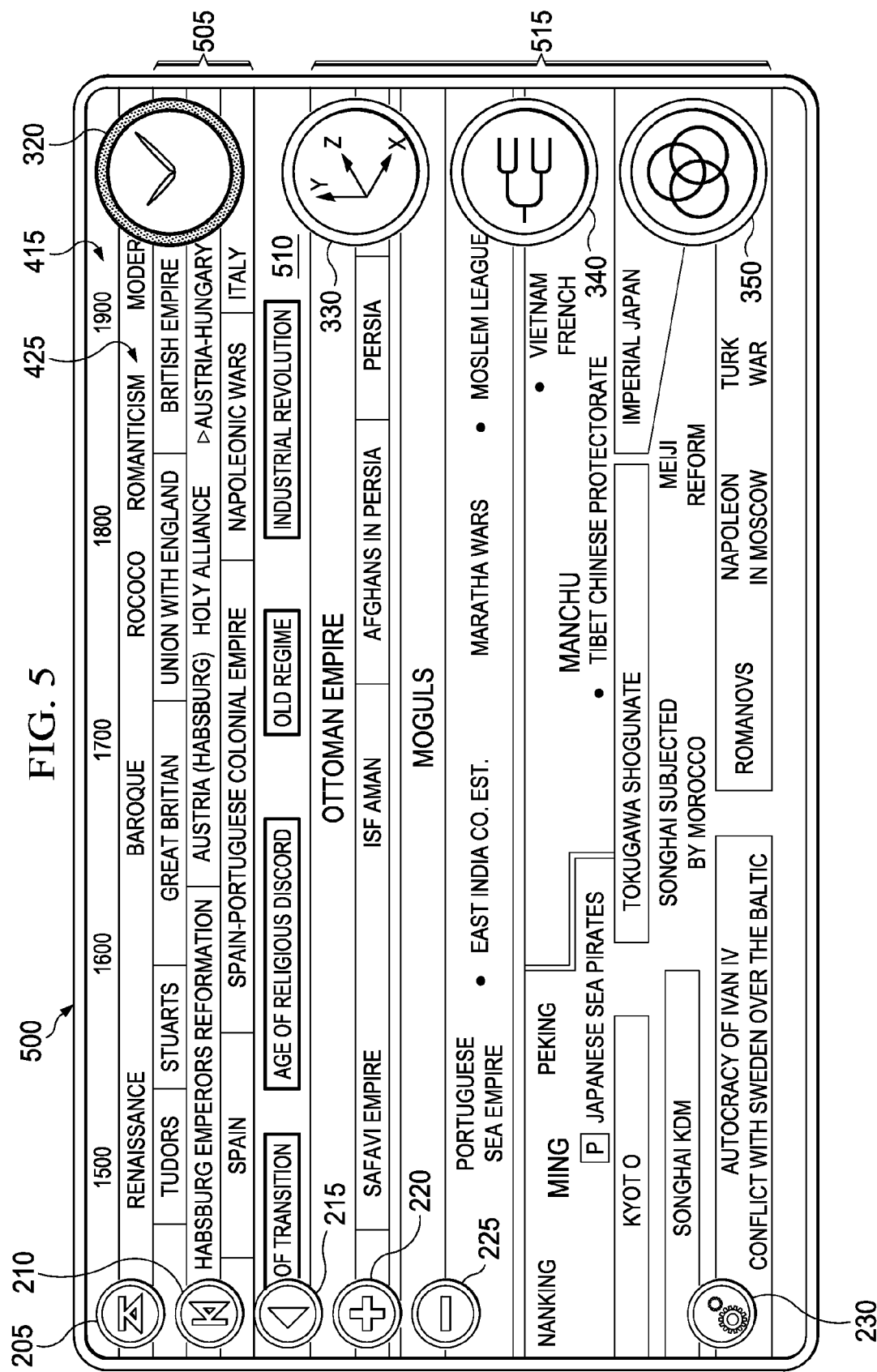
FIG. 5 illustrates the exemplary GUI window displaying the subject of the data in additional temporal context.

FIG. 5 illustrates the exemplary GUI window 500 displaying additional temporal context for Bach. In one embodiment, the content of the exemplary GUI window 500 is displayed upon scrolling down from the GUI window 400 described with reference to FIG. 4. Alternatively, the content of the exemplary GUI window 500 is displayed in response to zooming out (e.g., using the zoom out button 225). The functionality of the various buttons 205-230 and 320-350 follows the description above with reference to FIG. 4.

In one embodiment the date timeline 415 remains visible regardless of the amount of scrolling. For example, when scrolling down, the date timeline 415 may reach the top of the GUI window 400 shown in FIG. 4 and remain locked there as the user scrolls into the GUI window 500 shown in FIG. 5.

Similar to the description above, various timelines are displayed to provide temporal context for the subject of the present data point, Bach. The exemplary GUI window 500 includes period timelines 425 and 510 for art and cultural periods. The exemplary GUI 500 also includes timelines 505 and 515 depicting the ebb and flow of empires and civilizations.

Figure 6:
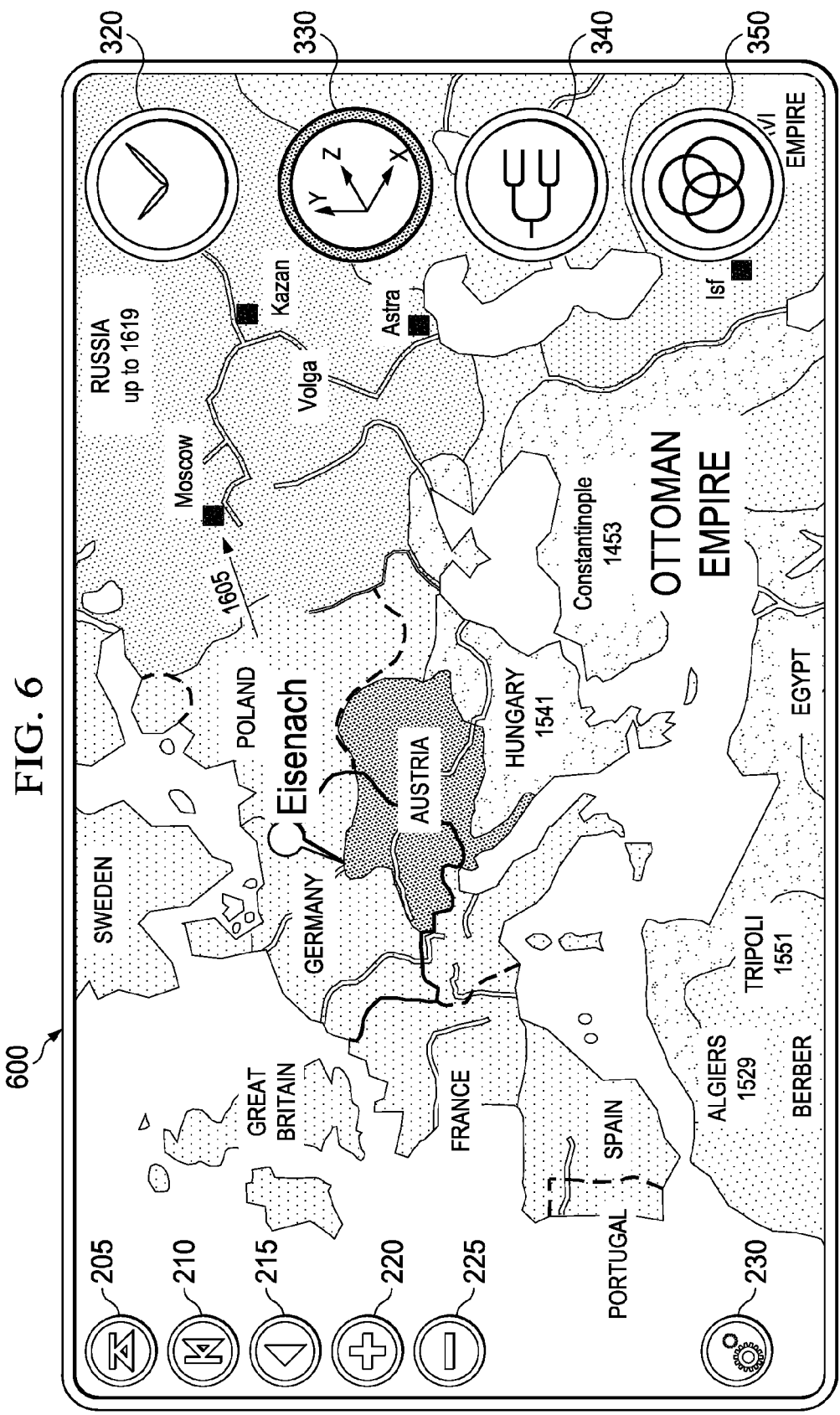
FIG. 6 illustrates the exemplary GUI window displaying the subject of the data in a spatial context.

FIG. 6 illustrates the exemplary GUI window 600 displaying the subject of the present data point, Bach, in a spatial context. The functionality of the various buttons 205-215, 230, and 320-350 follows the description above. In one embodiment, when the spatial context is selected, the spatial context display button 330 is highlighted.

The spatial context display in the exemplary GUI window 600 includes a map of 17th-18th century Europe in which Bach lived. In one embodiment, spatial data related to the subject of the present data point is included in the spatial context display. For example, Eisenach, Bach's birthplace, is predominately displayed. Other spatial points of interest may also be displayed to indicate other locations relevant to Bach's life. In one embodiment, the spatial context display includes dates and the geographical reach of the empires at the time of Bach. In yet another embodiment, the spatial context display includes geographical points of interest relevant to other personalities, events, etc., such as the birthplaces of other great composers.

Similar to the discussion above, user selection of the data points displayed in the exemplary GUI window 600 causes the computer to navigate to the subject matter of the selected data point. For example, selection of Eisenach would result in navigating to the cell and corresponding displays for the town of Eisenach.

In one embodiment, the zoom buttons 220 and 225 (or equivalent zoom commands) decrease and increase, respectively, the range of the displayed map. Likewise, a translation of the map (e.g., by scrolling) would reveal other areas to the north, east, south and west. Alternatively, or additionally, zooming in and zooming out adds and removes, respectively, data points within an affected portion of the map. In one embodiment, the inclusion or exclusion of data points is determined based upon available display space and relative importance, popularity, relevance, etc. (as described in greater detail below).

In one embodiment, the spatial context display includes a three dimensional (3D) map. For example, the illustration of a galaxy would benefit from the use of a 3D map. In addition to panning and zooming, a 3D map would further include controls to rotate about an axis. For example, an additional button (not shown) or touch gesture may be used to implement rotation within 3D space.

Figure 7A:
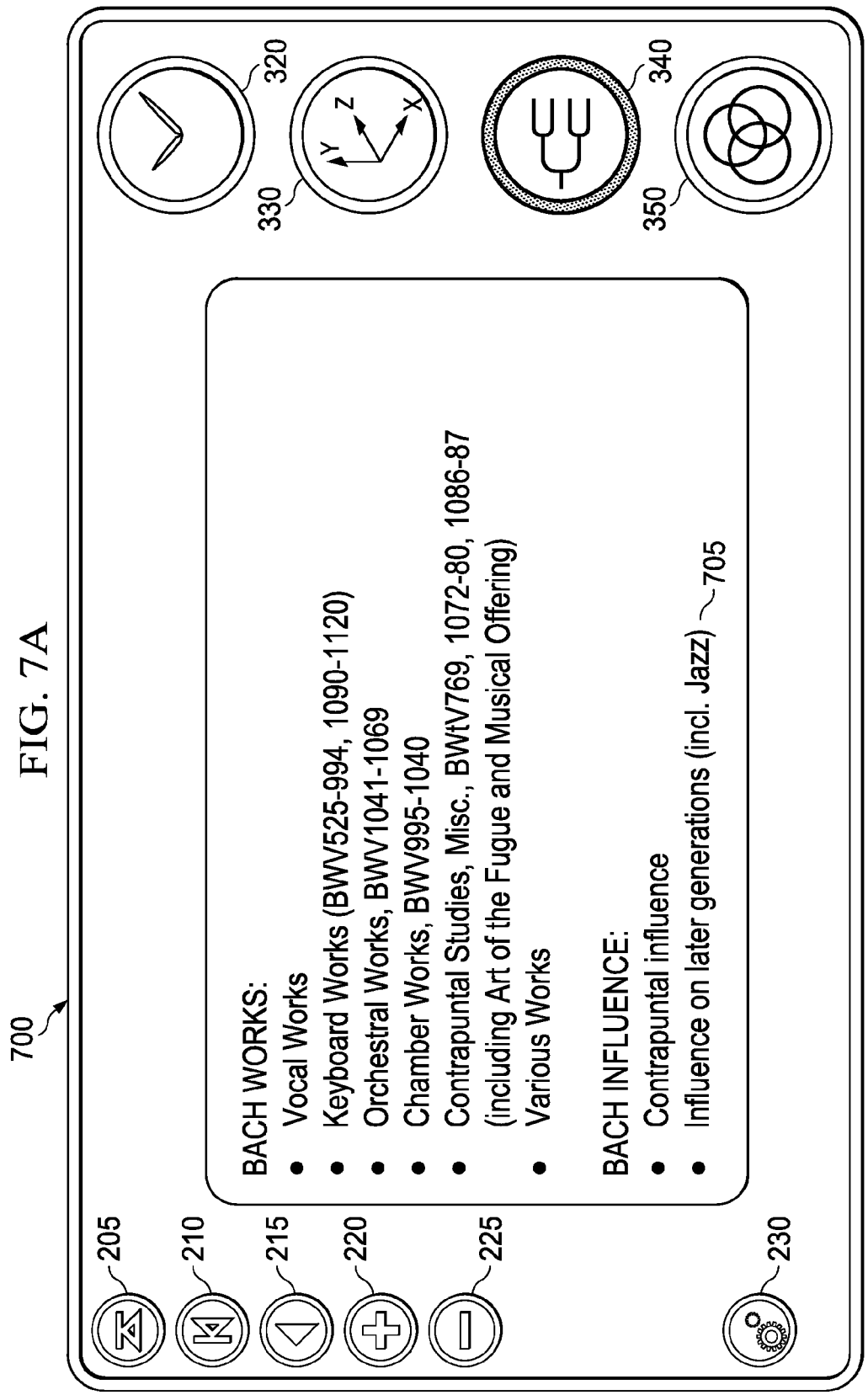
FIG. 7A illustrates the exemplary GUI window displaying the subject of the data in a causal context.

FIG. 7A illustrates the exemplary GUI window 700 displaying the subject of the present data, Bach, in a causal context. The functionality of the various buttons 205-215, 230, and 320-350 follows the description above. In one embodiment, when the causal context is selected, the causal context display button 340 is highlighted.

In one embodiment, the causal data points include individuals, art forms, events, etc. influenced by or that influenced the subject of the present data. Similar to the discussion above, user selection of the data points displayed in the exemplary GUI window 700 causes the computer to navigate to the subject matter of the selected data point. For example, the causal context display in GUI window 700 provides the user selectable entry points to Bach's work categories and to general results of Bach's influence.

FIG. 7B illustrates exemplary GUI window 706 displaying data of a cell in response to the selection of Influence on later generations 705 in FIG. 7A. Similar to GUI window 300 described above, GUI window 706 includes a plurality of selectable objects to view the subject of the data in varying contextual relationships. Bach's influence on later generations serves as central element 710 and includes an image of Bach (e.g., from the representation bank 140) and descriptive text (e.g., from the description field of the cell). Around the central element 710, the GUI display 706 includes four contextual relationship screens and corresponding selectable objects 715-730. The upper-left portion of the GUI display 706 shows a view of a temporal display screen 715 overlaid by a corresponding selectable temporal display button 320. The upper-right portion of the GUI display 706 includes a view of a spatial display screen 720 overlaid by a corresponding selectable spatial display button 330. The lower-left portion of the GUI display 706 includes a view of a causal display screen 725 overlaid by a corresponding selectable causal display button 340. The lower-right portion of the GUI display 706 includes a view of an inclusion display screen 730 overlaid by a corresponding selectable inclusion display button 345. Receipt of user input selecting one of the four selectable display buttons 715, 720, 725, and 730 results in the computer displaying the corresponding contextual view (e.g., as described herein). Additionally, in one embodiment, the four contextual display screens 715, 720, 725, and 730 are selectable, the selection causing the computer to display the corresponding contextual view.

Returning to FIG. 7A, in one embodiment, the zoom buttons 220 and 225 (or equivalent zoom commands) decrease and increase, respectively, the range of the displayed temporal range of causal influence. Alternatively, or additionally, zooming affects the focus of the cause and effect relationships. For example, zooming in may focus on the causal relationship of a single work of Bach rather than a collection of works. Alternatively, or additionally, the zooming in and zooming out results in adding or removing items that served as a cause of or influence upon the subject of the present data. For example, zooming out of this screen using the zoom out button 225 would allow the display of the influences that mattered to Bach. In one embodiment, the inclusion or exclusion of data points is determined based upon available display space and relative importance, popularity, relevance, etc. (as described in greater detail below).

Figure 7C:
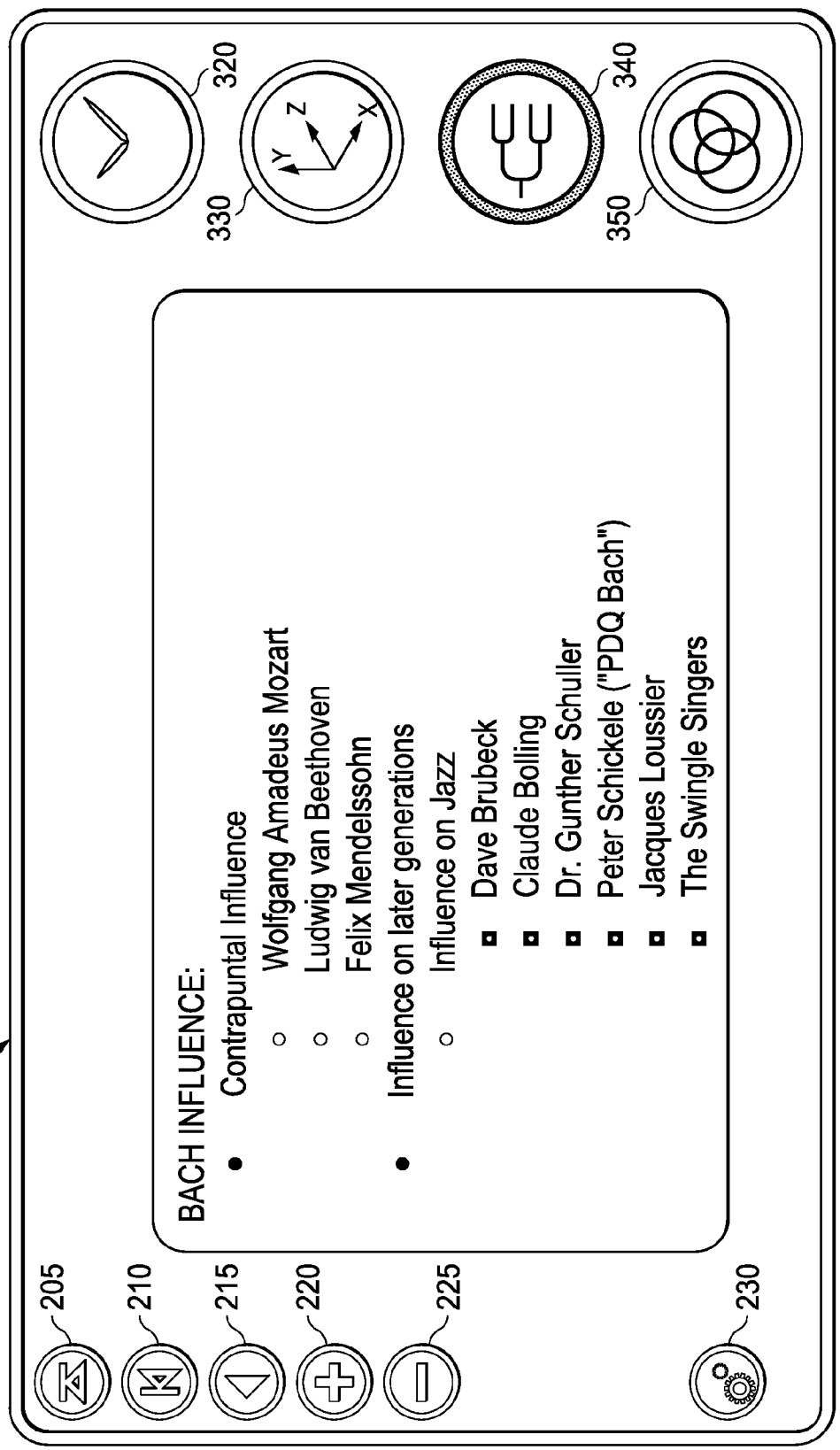
FIG. 7C illustrates the exemplary GUI window of FIG. 7A after performing a zoom operation.

FIG. 7C illustrates an exemplary GUI window 735 resulting from performing a zoom operation within GUI window 700 of FIG. 7A. The GUI window 735 illustrates a focus on Bach's contrapuntal influence and influence on later generations. As a result of the zoom from GUI window 700 to GUI window 735, Bach's contrapuntal influence has been expanded to include other composers influenced by Bach's use of contrapuntal techniques. Additionally, Bach's influence on later generations, in particular Bach's influence on jazz, has been expanded to include jazz musicians and composers influenced by Bach.

Figure 8:
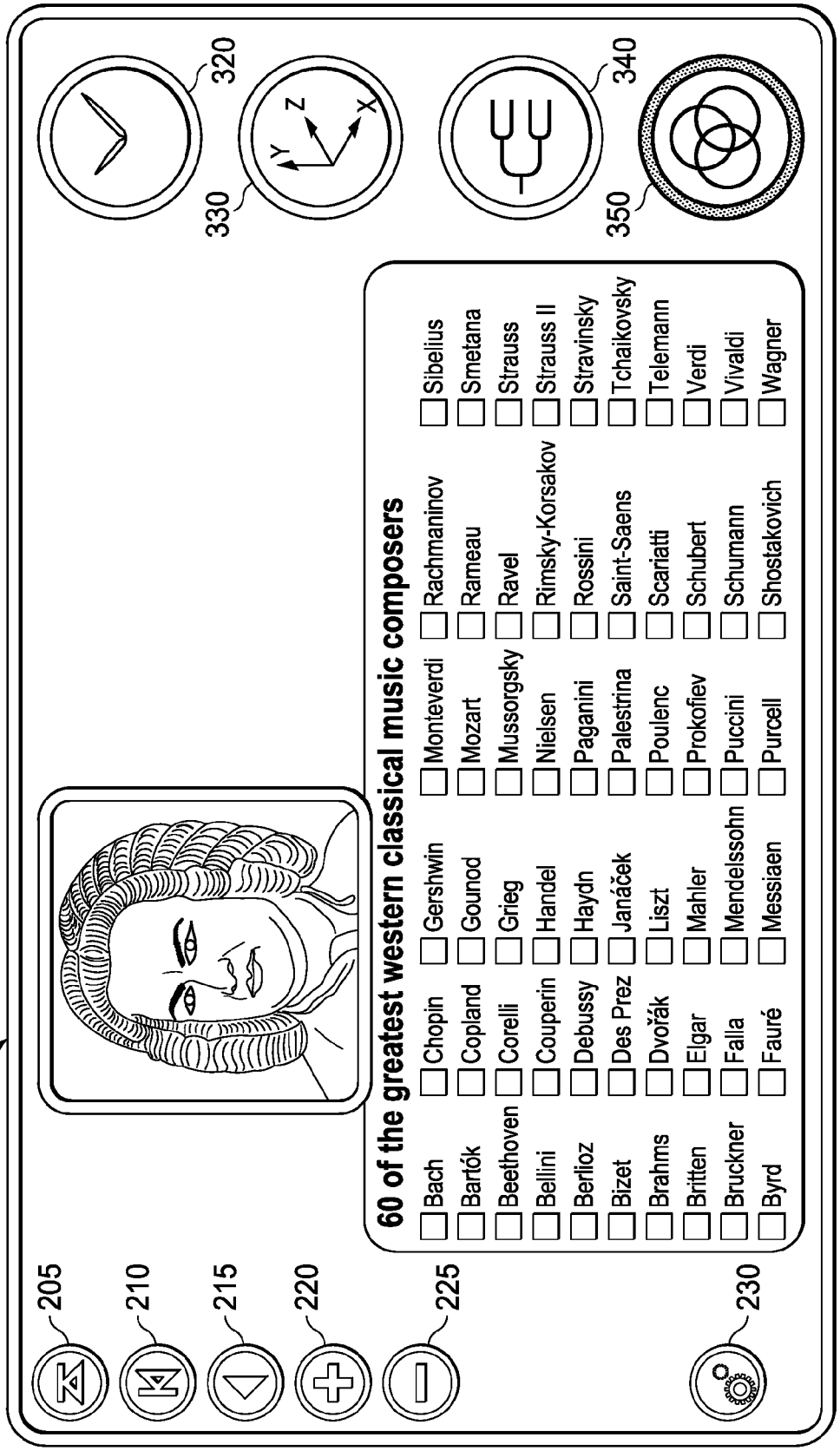
FIG. 8 illustrates the exemplary GUI window displaying the subject of the data in an inclusion context.

FIG. 8 illustrates the exemplary GUI window 800 displaying the subject of the data, Bach, in an inclusion context. The functionality of the various buttons 205-215, 230, and 320-350 follows the description above. In one embodiment, when the inclusion context is selected, the inclusion context display button 350 is highlighted.

The inclusion display in GUI window 800 includes a list of composers of western classical music, a set to which Bach belongs. Similar to the discussion above, user selection of the data points displayed in the exemplary GUI window 800 causes the computer to navigate to the subject matter of the selected data point. For example, each name in the set of composers can be selected to allow navigation to respective composer.

In one embodiment, the zoom buttons 220 and 225 (or equivalent zoom commands) decrease and increase, respectively, the number of data points to include within a given set. For example, zooming out from the displayed 60 composers may result in displaying 100 western classical music composers. Alternatively, or additionally, the zooming in and zooming out result in adding or removing data points based upon temporal constraints. Alternatively, or additionally, the zooming in and zooming out result in adding or removing categories within the inclusion context set. For example, zooming out may result in adding or removing other categories of music, such as popular or non-western music that incorporates or is influenced by/related to Bach, or subcategories of classical music. In one embodiment, the inclusion or exclusion of data points is determined based upon available display space and relative importance, popularity, relevance, etc. (as described in greater detail below).

Figure 9:
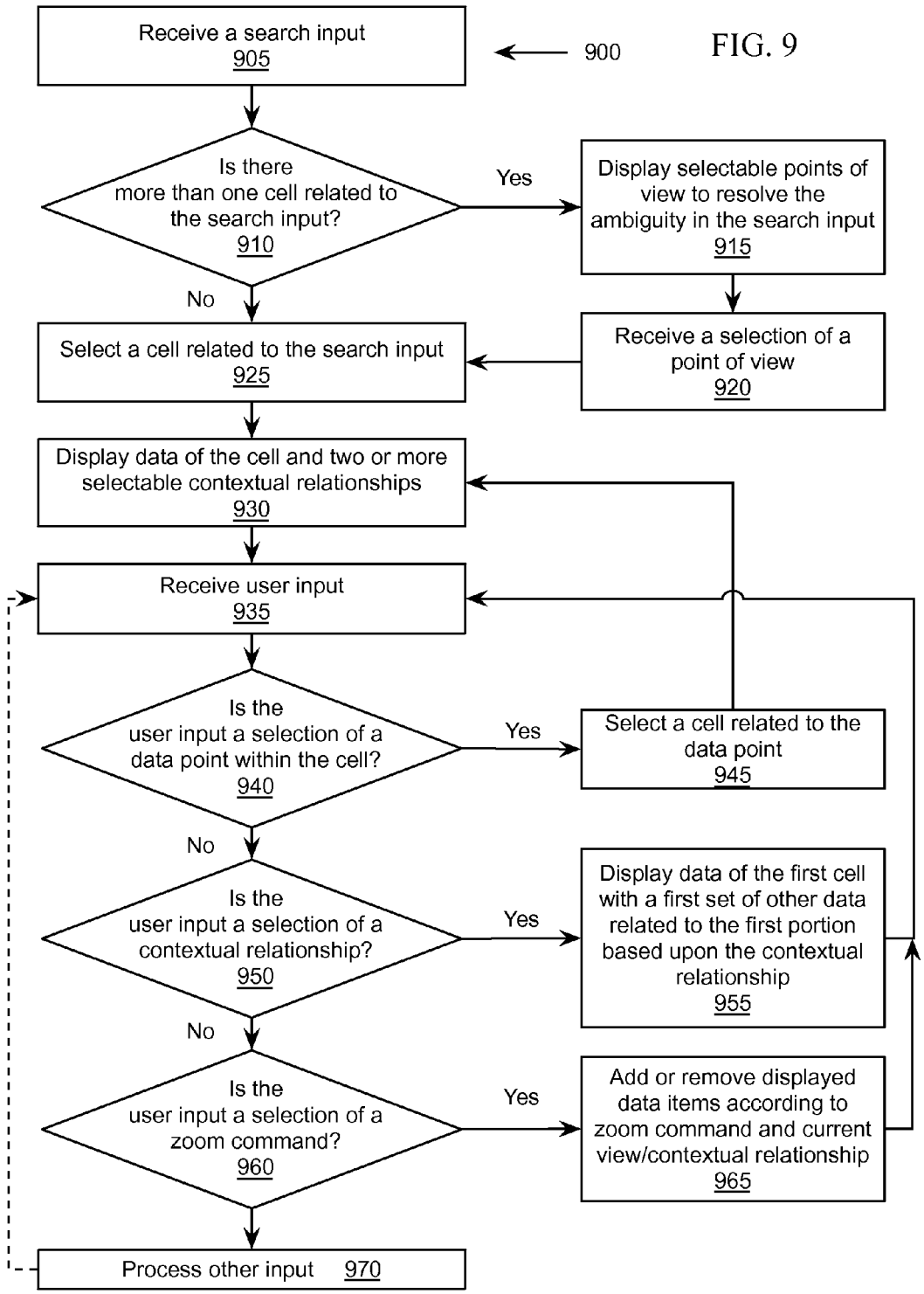
FIG. 9 is a flow chart illustrating an exemplary method of displaying data with systematic contextual views in response to a search input.

FIG. 9 is a flow chart illustrating an exemplary method 900 performed by a processing device/computer to display data with systematic contextual views in response to a search input. At block 905, the device receives a search input. In one embodiment the search input is received as a text string entered, e.g., in a text search box 235. Alternatively, the device receives a token comprising a barcode, matrix barcode, or alphanumeric string by another means. For example, the device may receive a token through cursor selection of a displayed data point (e.g., clicking an Internet address), voice recognition, via a network connection, or via a camera/optical scan of a bar code, matrix bar code, or other pattern.

Various methods are envisioned for communicating the token to the user, including printing a token on an item, such as a book, compact disc cover, ticket, program, sign, etc. For example, the user may be at a concert where he is listening to a particular work of Beethoven. Next to the entry for that work in the printed program, a printed token is provided (e.g., as a string or as a QR code), which the user can input into his device in order to display information about Beethoven from the matrix. Furthermore, the information about Beethoven may be focused upon that which the publisher of the program desires to bring to the attention of the user.

Broadcasting of tokens may take advantage of transmission through networks, such as the Internet. Tokens can be delivered in concert with the particular action, event, broadcast, or program being watched, listened to, or otherwise interacted with, such as the concert discussed in the previous example. In one embodiment, the program indicates aurally that a token is available from a particular Internet address and can be retrieved via a computer or other device. In yet another embodiment, a token is transmitted directly to an individual, e.g., via email, messaging, etc.

In one embodiment, at block 910, the device determines if there is more than one cell related to and found in response to the search input. For example, the device may determine that multiple cells are related if they each contain a search term in their respective titles and/or descriptions. If there is more than one cell related to the search input, the device displays selectable points of view to resolve the ambiguity in the search input at block 915. The points-of-view offered to the user are associated with respective cells or arrays determined to be relevant to the subject searched. Exemplary points-of-view include field/sub-field categorization, cell type, cell title, or a portion of cell description. At block 920, the device receives input to select a point of view.

For example, searches for "J. S. Bach" or "Maxwell's equations," the data related to these topics may not lend itself to being viewed from various points-of-view, and thus the user may not be provided with an option to select a point-of-view for those searches. A search for warfare, however, may benefit from being viewed from multiple points-of-view, as warfare can be seen from several vantage points: historical, ethical, religious, etc. If the device determines that multiple cells are related to warfare, the user is prompted to select a point-of-view, e.g., via selectable items in a list. This has the advantages of (1) giving the user an immediate grasp of the fact that a theme invokes more than just one discipline, and (2) allowing the system to reveal relationships that are predicated by the selected point-of-view. The point-of-view acts as a meta-relation.

At block 925, in response to determining that there is not more than one cell related to the search input, or in response to receiving a selection of a point of view, the device selects a cell related to the search input. In an alternate embodiment, the device proceeds to block 925 from block 905 without considering points-of-view. At block 930, the device displays data of the cell in response to the search input. Additionally, the device displays at least two selectable contextual relationships. For example, in response to a search for Bach, the device selects the cell within the matrix for Johann Sebastian Bach and displays the corresponding data, as illustrated in FIG. 2.

A token functions as a pointer to a particular cell, as discussed with reference to FIG. 1. In one embodiment, the token defines a contextual relationship view to be displayed. For example, in response to a search for Bach, the device selects the cell within the matrix for Johann Sebastian Bach and displays the corresponding data in a contextual as indicated by the token, as illustrated in any of FIGS. 2-8. The input of a token causes the retrieval of a predetermined matrix view which provides a visual perspective on, e.g., Beethoven's time in a music period timeline, which may indicate that the work in question is part of the Romantic Period and that this period comes after the Baroque and Classical Periods, and precedes the Late- and Post-Romantic Periods.

In one embodiment, the token defines the part and scope of the matrix that is to be displayed on the screen. For example, an unrestricted user can zoom-out to visualize the entire music timeline, as far back as 32,000 years ago when the first recovered musical instruments were made and continuing through present day. If the token defines a limited scope, however, the user may be restricted from zooming out beyond, e.g., the Renaissance through Romantic Period. In one embodiment, the token also defines the initial zoom magnification, spatial orientation, or scroll position of the GUI window displayed in response to the search input.

Alternatively, or additionally, the defined scope may limit the user from selecting one or more data points, selecting one or more contextual views, navigating beyond a predetermined number or set of links to other cells, navigating outside of a predetermined set of cells, or navigating between fields/sub-fields, depending on the perspective the token generator wishes to convey to the user who receives and uses the token. Such limitations of scope enable a teacher, e.g., to keep students from becoming distracted by off-topic subject matter.

In yet another embodiment, the defined scope may limit the level of detail presented to the user, set a vocabulary level, or otherwise tailor the presentation of data to the situation or audience. For example, a grade school student may benefit from the presentation of a cell within a discipline of science at an introductory level while a college student would benefit from a deeper dive into the same subject.

In an additional embodiment, the defined scope provides a subject-based limitation on and/or starting point for the subject of the search input. For example, a token may result in a limited view or initial focus upon a particular genre of the Beethoven's work, such as symphonies, rather than the other genres in which he composed. If unrestricted, the user may zoom-out to view the classification other genres (concertos, preludes, etc.).

In one embodiment, one or more of user preferences provide a scope or initial view of the displayed cell data. For example, using default settings or the settings button 230, a user can benefit from preferences such as education level, initial contextual view, initial zoom level, display characteristics (such as font size), restrictions upon selecting one or more data points, restrictions upon selecting one or more contextual views, restrictions upon navigating beyond a predetermined number or set of links to other cells, restrictions upon navigating outside of a predetermined set of cells, or restrictions upon navigating between fields/sub-fields. Such preferences would include the ability to focus on narrow or wide temporal, spatial, causal, or inclusion relations. In one embodiment, one or more of the user preferences are overridden by views or scope preferences defined by a token. Alternatively, the user preferences are not overridden by views or scope preferences defined by a token. Such preferences may also be overridden through an adaptive learning system, described below. In one embodiment, the user selects which preferences may be overridden by tokens or the adaptive learning system.

After having used the system for a period of time, the system can build a table of tokens, or another data structure, that reflects the history of what has been displayed to the user, how it was displayed, and on what the user has focused. Additionally, the processing device may use the history to automatically determine the user's preferred viewing method. For example, once a user's history has been compiled to a predetermined level (e.g., number of tokens, during a period of time, etc.), the processing device determines if the use shows more use of a particular contextual relationship than others for all cells or for cells within particular fields/sub-fields. In one embodiment, the system uses the history in one of two ways: (1) to prompt the user to view new material, outside of the areas already visited by the user, and (2) to encourage the user to delve deeper into subject matter within the same areas previously visited.

Likewise, based upon the user's history and preferred method of display, the system can adapt the presentation of initial matrix visualization entry-points. For example, if the user has navigated the system using a majority of wide temporal timelines, and the user is interested in, e.g., the Woodstock event, the system would initially provide a wide timeline of events surrounding Woodstock (temporal relation) instead of the map of the area of Woodstock, N.Y. (spatial relation), the causes and effects of the concert (causal relation), or a list of other major rock concert events (inclusion relation).

In one embodiment, tokens are received and/or stored in a first-in/first-out (FIFO) array. The depth of the array may be defined by system default or by the user, giving control on the length of the stored history. Additionally, user-initiated matrix visualizations, via text entry, link selection, etc., may also be stored as tokens in the FIFO array to permit revisiting recent visualizations. In one embodiment, the tokens are flagged to indicate whether or not the tokens are user-initiated (e.g., rather than being received from a broadcaster) to distinguish them for retrieval. According to a default setting or user preference, the device automatically creates an entry in the history for each displayed cell, contextual view, zoom level, scroll/pan position of a window, etc., e.g., in response to a user input to change a view. Alternatively, the processing device automatically stores a new history token upon the expiration of a timer/counter, e.g., every few seconds or minutes or at the user's discretion. Using the time-based automated token storage, the device may only store a new token if found to be different from the immediately preceding one.

At block 935, the processing device receives user input. At block 940, the device determines if the input is a selection of a data point within the cell. For example, referring to FIG. 8, user selection of another composer (e.g., Chopin), would be determined to be the selection of the data point for another cell. If the input is a selection of another data point, at block 945, the device selects the cell related to the data point and, at block 930, displays the corresponding data.

If the input is not a selection of another data point, at block 950, the device determines if the input is a selection of a contextual relationship. If a contextual relationship has been selected, at block 955, the device displays a portion of the data of the present subject matter with a set of related data based upon the selected contextual relationship. For example, referring to FIG. 4, Bach, the time Bach lived, and the identification of Bach as a composer, are a portion of the data of the cell displayed in response to a search for Bach. The selection of the temporal contextual relationship displays this portion of the data with one or more timelines of other personalities, events, periods, empires, etc. as they relate to the time Bach lived.

If the input is not the selection of a contextual relationship, at block 960, the device determines if the input is a zoom command. If the input is a zoom command, at block 965, the device alters the display according to one or more zoom embodiments discussed above. For example, the device may add or remove displayed data points in response to the zoom command, scope limitations, the current contextual relationship, etc.

If the input is not a zoom command, at block 970, the device otherwise determines the type of input and processes the input accordingly. Other exemplary inputs include commands resulting from use of the navigation buttons 205-215, the settings button 230, the entry of a new search input, a request to generate a token or set of tokens, or a request to add a cell within the matrix or create a new link between two cells.

In one embodiment, the processing device generates one or more tokens in response to user input. For example, using an indexing system or other means that allows the discrimination between cells and their views with sufficient resolution, the processing device generates a string, address, bar code, or other token in response to a user input. In an additional embodiment, the processing device generates a token or series of tokens for a presentation including multiple views/cells in response to user input, e.g., the selection of a plurality of tokens from the user's history (as described above) or by tracking current user navigation/manipulation of the matrix. In one embodiment, the processing device enables or prompts the user to designate scope limitations, a preferred contextual relationship, education level, etc. as discussed above with reference to display preferences and scope. The user may then transmit, publish, or otherwise share the generated token(s).

In one embodiment, the user input is a request to add a new cell or link/contextual relationship between cells. For example, the display may provide an input form on a dedicated screen that will allow the input of new material or new relationships, which can then be vetted (e.g., by an editorial board) before being incorporated into the matrix.

As described above, the inclusion or exclusion of data points is determined based upon available display space and relative importance, popularity, relevance, etc. In one embodiment, a curator manually sets the importance or relevance of a data point. Alternatively, the processing device employs adaptive learning and monitors usage of the matrix to determine the relative importance, popularity, or relevance. For example, the device determines the number of views of each particular cell/data point and/or the contextual relationship/zoom level view thereof by incrementing counters as a user navigates the matrix. In one embodiment, the cell 100 includes one more counter fields. Additionally, or alternatively, the device maintains counters for groups of cells and/or connections between cells. Fields and/or sub-fields (e.g., science/matter & energy/physics/relativity) may each have counters. Using determined numbers of views of cells as an indication of importance, popularity, or relevance, the processing device prioritizes which cells to include in a limited display space. When a user zooms in or zooms out of a crowded display, the processing device is able to use the counters (or manually set values) to maintain important items in view while allowing less important items to fade into the background. Additionally, or alternatively, using determined numbers of traversals between cells, the processing device prioritizes which data points to include in a limited display space. For example, if a great number of users traverse from a cell for Bach to a cell for Handel, the processing device determines that the cell for Handel is of higher importance, popularity, or relevance in a contextual view of Bach. In one embodiment, the processing device utilizes the counters in an adaptive manner to determine default contextual views and/or zoom levels for particular cells. In an additional embodiment, the processing device utilizes the counters in combination with the user's history to prompt the user to view new material or to encourage the user to delve deeper into subject matter within the same areas previously visited, based upon the importance, popularity, or relevance of a cell/connection to the cell.

Importance/relevance connections are also revealed through indirect traversals of the matrix. Given two end point cells in the matrix, the processing device computes a minimum path between them. A minimum path is computed, e.g., by traversing all related cells from the start point and, from these traversed cells, traversing their own related cells, and so on, until the second end point cell has been reached. Each cell traversal increases a counter that is associated with a particular path and adds the cell address to the traversal search path history to allow the path to be reconstituted.

In order to keep the search through the matrix within pragmatic bounds, a cell-count maximum is defined by a default or user setting. The cell-count maximum denotes the maximum number of cells allowed in a path. If, during a search, the cell-count maximum is reached before reaching the end of the search, the path is abandoned.

The path having the minimum count of traversals between cells may reveal a relationship between the cells that, otherwise, may not be a priori obvious. In one embodiment, paths with a minimum count less than a predetermined number indicate an importance or relevance between cells that is included in the determination of which data points to display at a given zoom level or is included to prompt/encourage the user to view particular content. Additionally, such a relationship may inform users, such as educators, who wish to illustrate the connections between two events, people, places, etc. or a person and a location, or an event and a person, etc. For example, in response to a request for all cells within a particular minimum path count (e.g., a default number or user inputted number), the processing device generates a list of cells that are within the minimum path count of a selected cell.

In one embodiment, each traversed cell can be weighted differently, based on predefined criteria, when calculating the minimum path. For example, causal relationships can be given an addend of 1, while all other relationships, including temporal, spatial, and inclusion, can be given an addend of 1.1, which would reveal connections with a causal relationship preference.

After processing the other input in block 970, the method 900 optionally returns to block 935 to wait for/receive further user input.

Figure 10:
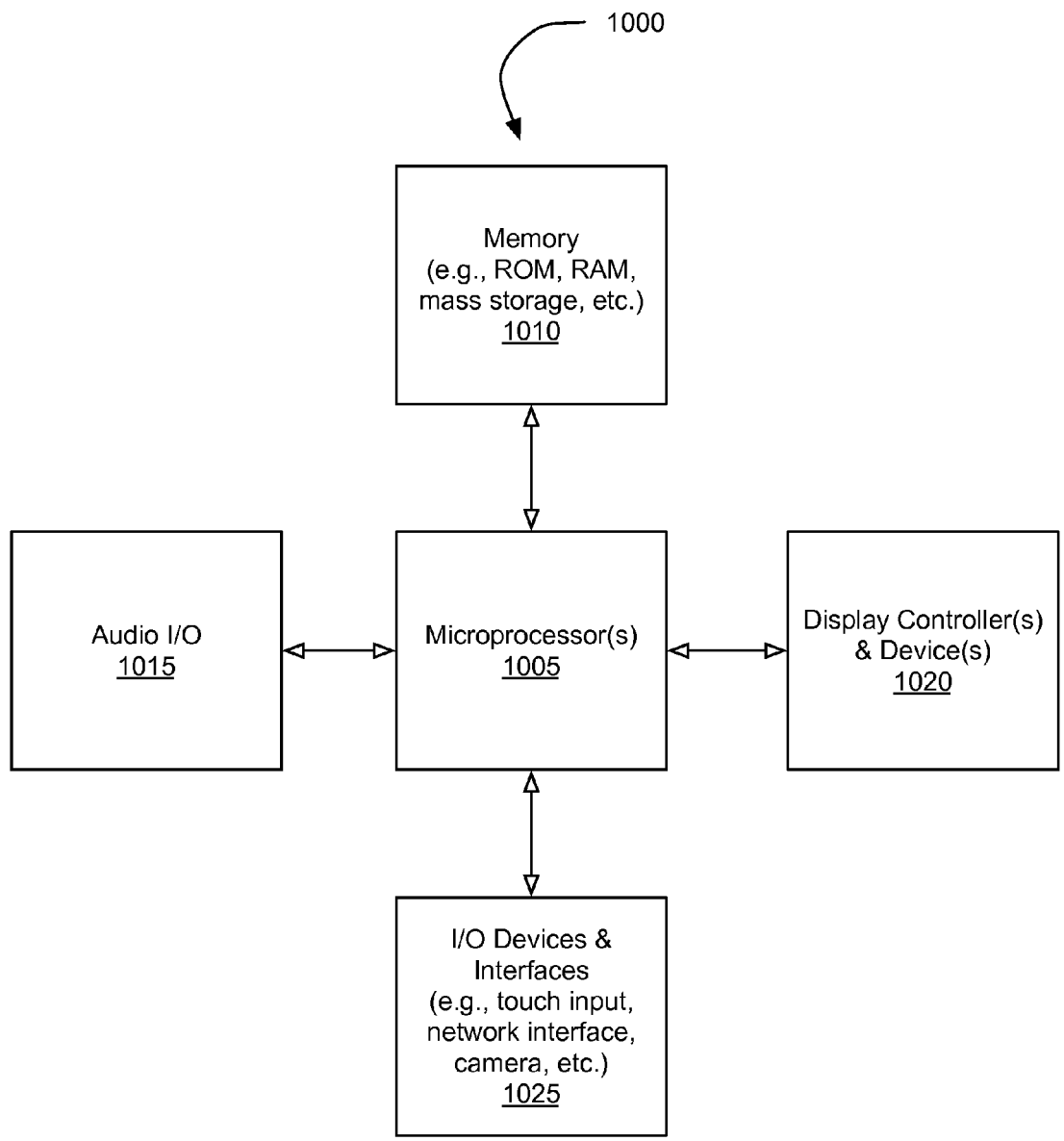
FIG. 10 illustrates, in block diagram form, an exemplary processing system to display data with systematic contextual views in response to a search input.

FIG. 10 illustrates, in block diagram form, an exemplary processing system 1000 to display data with systematic contextual views in response to a search input. Data processing system 1000 includes one or more microprocessors 1005 and connected system components (e.g., multiple connected chips). Alternatively, the data processing system 1000 is a system on a chip.

The data processing system 1000 includes memory 1010 which is coupled to the microprocessor(s) 1005. The memory 1010 may be used for storing data, metadata, and programs for execution by the microprocessor(s) 1005. The memory 1010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1010 may be internal or distributed memory.

The data processing system 1000 also includes an audio input/output subsystem 1015 which may include a microphone and/or a speaker for, for example, receiving an aural token, playing back music or other audio, receiving voice instructions to be executed by the microprocessor(s) 1005, playing audio notifications, etc. Exemplary voice instructions include search terms and navigation commands.

A display controller and display device 1020 provides a visual user interface for the user, e.g., GUI windows illustrated in FIGS. 2-8.

The system 1000 also includes one or more input or output ("I/O") devices and interfaces 1025, which are provided to allow a user to provide input to, receive output from, and otherwise transfer data to and from the system, e.g., to enter a token, generate a token, navigate the matrix, etc. These I/O devices 1025 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000.

The I/O devices and interfaces 1025 may also include a connector for a dock or a connector for a USB interface, FireWire, Thunderbolt, Ethernet, etc. to connect the system 1000 with another device, external component, or a network. Exemplary I/O devices and interfaces 1025 also include wireless transceivers, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 1000 with another device, external component, or a network and receive stored instructions, data, tokens, etc.

It will be appreciated that one or more buses, may be used to interconnect the various components shown in FIG. 10.

The data processing system 1000 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, the data processing system 1000 may be a network computer, server, or an embedded processing device within another device or consumer electronic product. As used herein, the terms computer, system, device, processing device, and "apparatus comprising a processing device" may be used interchangeably with the data processing system 1000 and include the above-listed exemplary embodiments.

It will be appreciated that additional components, not shown, may also be part of the system 1000, and, in certain embodiments, fewer components than that shown in FIG. 10 may also be used in a data processing system 1000. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network interface device 1025. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving, by a computer, a search input;
selecting, by the computer, a first cell within a matrix of cells in response to the search input, wherein each cell within the matrix of cells includes searchable data, the first cell is selected based upon the first cell including searchable data related to the search input, and the first cell further includes a first link assigned a causal context relationship and providing a navigation link from the first cell to a causal context cell corresponding to the first cell, a second link assigned an inclusion contextual relationship and providing a navigation link from the first cell to an inclusion context cell corresponding to the first cell, a third link assigned a temporal contextual relationship and providing a navigation link from the first cell to a temporal context cell corresponding to the first cell, and fourth link assigned a spatial contextual relationship and providing a navigation link from the first cell to a spatial context cell corresponding to the first cell;
displaying, in response to the search input, a portion of the searchable data of the first cell and first, second, third, and fourth selectable objects, the first selectable object corresponding to the first link, the second selectable object corresponding to the second link, the third selectable object corresponding to the third link, and the fourth selectable object corresponding to the fourth link;

receiving selection of the first, second, third, or fourth of the plurality of selectable objects; and utilizing the corresponding link to display a context cell corresponding to the first cell, wherein selection of a first of the plurality of selectable objects results in the computer utilizing the first link to select and display the causal context cell corresponding to the first cell, the display of the causal context cell including displaying a subject of the first cell as causing or influencing one or more subjects of other cells or as being caused or influenced by one or more subjects of other cells, wherein selection of a second of the plurality of selectable objects results in the computer utilizing the second link to select and display the inclusion context cell corresponding to the first cell, the display of the inclusion context cell including displaying the subject of the first cell within a category along with subjects of other cells included within the category, wherein selection of a third of the plurality of selectable objects results in the computer utilizing the third link to select and display the temporal context cell corresponding to the first cell, the display of the temporal context cell including displaying the subject of the first cell within a timeline along with subjects of other cells of relevance within the timeline, wherein selection of a fourth of the plurality of selectable objects results in the computer utilizing the fourth link to select and display the spatial context cell corresponding to the first cell, the display of the spatial context cell including displaying a location corresponding to the subject of the first cell within a map, and when the received selection is of the first of the plurality of selectable objects, the method further comprising receiving a command to alter the zoom of the display of the corresponding portion of the data of the first cell and the first set of other data and, in response to the zoom command, adding or removing subjects that served as a cause of or influence upon the subject of the first cell, or adding or removing subjects that were caused or influenced by the subject of the first cell.

2. The computer-implemented method of claim 1, wherein the search input is a token comprising a barcode, matrix barcode, or alphanumeric string.

3. The computer-implemented method of claim 2, wherein the token defines a limited scope of the matrix of cells to be displayed.

4. The computer-implemented method of claim 2, wherein the token defines a contextual relationship view to be displayed for the data of the first cell.

5. The computer-implemented method of claim 1, further comprising:
generating a token comprising a barcode, matrix barcode, or alphanumeric string to serve as a search input and cause a computer to display a contextual relationship view of the data of the first cell.

6. The computer-implemented method of claim 1, wherein the matrix of cells is organized into groups of cells, each group of cells representing a field of knowledge, wherein the first cell is within a first group of cells representing a first field of knowledge, and wherein the first cell is linked to a second cell within a second group of cells representing a second, different field of knowledge.

7. The computer-implemented method of claim 1, further comprising:
determining that a plurality of cells include data related to the search input;
displaying a plurality of points of view, each of the plurality of points of view corresponding to one of the plurality of cells including data related to the search input; and
receiving a selection of a point of view corresponding to a first field of knowledge, wherein the selection of the first cell is based upon the first cell including data related to the search input and the first cell corresponding to the selected point of view.

8. The computer-implemented method of claim 1, further comprising:
displaying a zoom level or contextual relationship view for the data of the first cell based upon a compiled history for a user.

9. The computer-implemented method of claim 1, further comprising:
prompting a user to select a second cell based upon a compiled history for the user, wherein the compiled history indicates that the user has not previously selected the second cell.

10. The computer-implemented method of claim 1, further comprising:
selecting a second cell within the matrix of cells; and
determining a minimum path of connections between the first cell and the second cell.

11. The computer-implemented method of claim 1, wherein the data displayed in response to the search input or the selection of the first, second, third, or fourth selectable objects includes selectable content, and wherein selection of the selectable content results in the computer displaying the data of a second cell.

12. The computer-implemented method of claim 1, further comprising:
generating a plurality of tokens representing a plurality of cells within the matrix, contextual relationships, or zoom levels viewed by a user.

13. The computer-implemented method of claim 1, further comprising:
receiving user input to add a second cell within the matrix of cells or create a new link between two cells.

14. The computer-implemented method of claim 1, further comprising:
maintaining counters for one or more of (a) access of a cell, (b) access of one cell from another cell, (c) access of a group of cells, and (d) use of a contextual relationship of a cell; and
determining to include data from a cell within the corresponding context cell based upon one or more of the counters.

15. A non-transitory computer-readable storage medium storing instructions that, when executed, cause a processing device to perform a method comprising:
receiving a search input;
selecting a first cell within a matrix of cells in response to the search input, wherein each cell within the matrix of cells includes searchable data, the first cell is selected based upon the first cell including searchable data related to the search input, and the first cell further includes a first link assigned a causal context relationship and providing a navigation link from the first cell to a causal context cell corresponding to the first cell, a second link assigned an inclusion contextual relationship and providing a navigation link from the first cell to an inclusion context cell corresponding to the first cell, a third link assigned a temporal contextual relationship and providing a navigation link from the first cell to a temporal context cell corresponding to the first cell, and fourth link assigned a spatial contextual relationship and providing a navigation link from the first cell to a spatial context cell corresponding to the first cell;

displaying, in response to the search input, a portion of the searchable data of the first cell and first, second, third, and fourth selectable objects, the first selectable object corresponding to the first link, the second selectable object corresponding to the second link, the third selectable object corresponding to the third link, and the fourth selectable object corresponding to the fourth link;

receiving selection of the first, second, third, or fourth of the plurality of selectable objects; and utilizing the corresponding link to display a context cell corresponding to the first cell, wherein selection of a first of the plurality of selectable objects results in the computer utilizing the first link to select and display the causal context cell corresponding to the first cell, the display of the causal context cell including displaying a subject of the first cell as causing or influencing one or more subjects of other cells or as being caused or influenced by one or more subjects of other cells, wherein selection of a second of the plurality of selectable objects results in the computer utilizing the second link to select and display the inclusion context cell corresponding to the first cell, the display of the inclusion context cell including displaying the subject of the first cell within a category along with subjects of other cells included within the category, wherein selection of a third of the plurality of selectable objects results in the computer utilizing the third link to select and display the temporal context cell corresponding to the first cell, the display of the temporal context cell including displaying the subject of the first cell within a timeline along with subjects of other cells of relevance within the timeline, wherein selection of a fourth of the plurality of selectable objects results in the computer utilizing the fourth link to select and display the spatial context cell corresponding to the first cell, the display of the spatial context cell including displaying a location corresponding to the subject of the first cell within a map, and when the received selection is of the first of the plurality of selectable objects, the method further comprising receiving a command to alter the zoom of the display of the corresponding portion of the data of the first cell and the first set of other data and, in response to the zoom command, adding or removing subjects that served as a cause of or influence upon the subject of the first cell, or adding or removing subjects that were caused or influenced by the subject of the first cell.

16. The non-transitory computer-readable medium of claim 15, wherein the search input is a token comprising a barcode, matrix barcode, or alphanumeric string.

17. The non-transitory computer-readable medium of claim 16, wherein the token defines a limited scope of the matrix of cells to be displayed or a contextual relationship view to be displayed for the data of the first cell.

18. The non-transitory computer-readable medium of claim 15, wherein the instructions, when executed, cause the processing device to perform a method further comprising:
generating a token comprising a barcode, matrix barcode, or alphanumeric string to serve as a search input and cause the processing device to display a contextual relationship view of the data of the first cell.

19. The non-transitory computer-readable medium of claim 15, wherein the matrix of cells is organized into groups of cells, each group of cells representing a field of knowledge, wherein the first cell is within a first group of cells representing a first field of knowledge, and wherein the first cell is linked to a second cell within a second group of cells representing a second, different field of knowledge.

20. The non-transitory computer-readable medium of claim 19, wherein the instructions, when executed, cause the processing device to perform a method further comprising:
determining that a plurality of cells include data related to the search input;
displaying a plurality of points of view, each of the plurality of points of view corresponding to one of the plurality of cells including data related to the search input; and
receiving a selection of a point of view corresponding to a first field of knowledge, wherein the selection of the first cell is based upon the first cell including data related to the search input and the first cell corresponding to the selected point of view.

21. The non-transitory computer-readable medium of claim 15, wherein the instructions, when executed, cause the processing device to perform a method further comprising:
displaying a zoom level or contextual relationship view for the data of the first cell based upon a compiled history for a user.

22. The non-transitory computer-readable medium of claim 15, wherein the instructions, when executed, cause the processing device to perform a method further comprising:
prompting a user to select a different zoom level or a second cell based upon a compiled history for the user.

23. The non-transitory computer-readable medium of claim 15, wherein the instructions, when executed, cause the processing device to perform a method further comprising:
selecting a second cell within the matrix of cells; and
determining a minimum path of connections between the first cell and the second cell.

24. The non-transitory computer-readable medium of claim 15, wherein the data displayed in response to the search input or the selection of the first, second, third, or fourth selectable objects includes selectable content, and wherein selection of the selectable content results in the processing device displaying the data of a second cell.

25. The non-transitory computer-readable medium of claim 15, wherein the instructions, when executed, cause the processing device to perform a method further comprising:
generating a plurality of tokens representing a plurality of cells within the matrix, contextual relationships, or zoom levels viewed by a user.

26. The non-transitory computer-readable medium of claim 15, wherein the instructions, when executed, cause the processing device to perform a method further comprising:
receiving user input to add a second cell within the matrix of cells or create a new link between two cells.

27. The non-transitory computer-readable medium of claim 15, wherein the instructions, when executed, cause the processing device to perform a method further comprising:
maintaining counters for one or more of (a) access of a cell, (b) access of one cell from another cell, (c) access of a group of cells, and (d) use of a contextual relationship of a cell; and
determining to include data from a cell within the corresponding context cell based upon one or more of the counters.

28. An apparatus comprising:
a processing device, wherein the processing device executes instructions that cause the apparatus to
receive a search input;
select a first cell within a matrix of cells in response to the search input, wherein each cell within the matrix of cells includes searchable data, the first cell is selected based upon the first cell including searchable data related to the search input, and the first cell further includes a first link assigned a causal context relationship and providing a navigation link from the first cell to a causal context cell corresponding to the first cell, a second link assigned an inclusion contextual relationship and providing a navigation link from the first cell to an inclusion context cell corresponding to the first cell, a third link assigned a temporal contextual relationship and providing a navigation link from the first cell to a temporal context cell corresponding to the first cell, and fourth link assigned a spatial contextual relationship and providing a navigation link from the first cell to a spatial context cell corresponding to the first cell;
display, in response to the search input, a portion of the searchable data of the first cell and first, second, third, and fourth selectable objects, the first selectable object corresponding to the first link, the second selectable object corresponding to the second link, the third selectable object corresponding to the third link, and the fourth selectable object corresponding to the fourth link;
receive selection of the first, second, third, or fourth of the plurality of selectable objects; and
utilize the corresponding link to display a context cell corresponding to the first cell,
wherein selection of a first of the plurality of selectable objects results in the computer utilizing the first link to select and display the causal context cell corresponding to the first cell, the display of the causal context cell including displaying a subject of the first cell as causing or influencing one or more subjects of other cells or as being caused or influenced by one or more subjects of other cells,
wherein selection of a second of the plurality of selectable objects results in the computer utilizing the second link to select and display the inclusion context cell corresponding to the first cell, the display of the inclusion context cell including displaying the subject of the first cell within a category along with subjects of other cells included within the category,
wherein selection of a third of the plurality of selectable objects results in the computer utilizing the third link to select and display the temporal context cell corresponding to the first cell, the display of the temporal context cell including displaying the subject of the first cell within a timeline along with subjects of other cells of relevance within the timeline,
wherein selection of a fourth of the plurality of selectable objects results in the computer utilizing the fourth link to select and display the spatial context cell corresponding to the first cell, the display of the spatial context cell including displaying a location corresponding to the subject of the first cell within a map, and
when the received selection is of the first of the plurality of selectable objects, the method further comprising receiving a command to alter the zoom of the display of the corresponding portion of the data of the first cell and the first set of other data and, in response to the zoom command, adding or removing subjects that served as a cause of or influence upon the subject of the first cell, or adding or removing subjects that were caused or influenced by the subject of the first cell.

29. The computer-implemented method of claim 1, further comprising:
receiving a second selection of a first, second, third, or fourth of the plurality of selectable objects, different from the previously received selection; and
displaying, in response to the received second selection, a corresponding portion of the searchable data of the first cell with data from one or more other cells that is related to the corresponding portion.

\* \* \* \* \*